Feb. 27, 1945.  A. S. RIGGS  2,370,194
STATIC EARTH INDUCTOR COMPASS
Filed Jan. 29, 1942
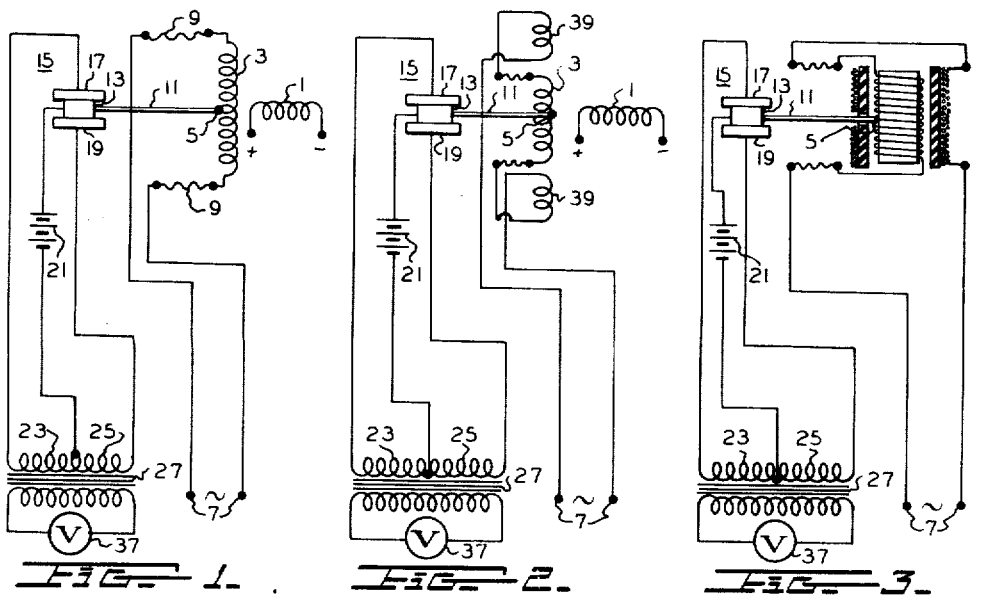
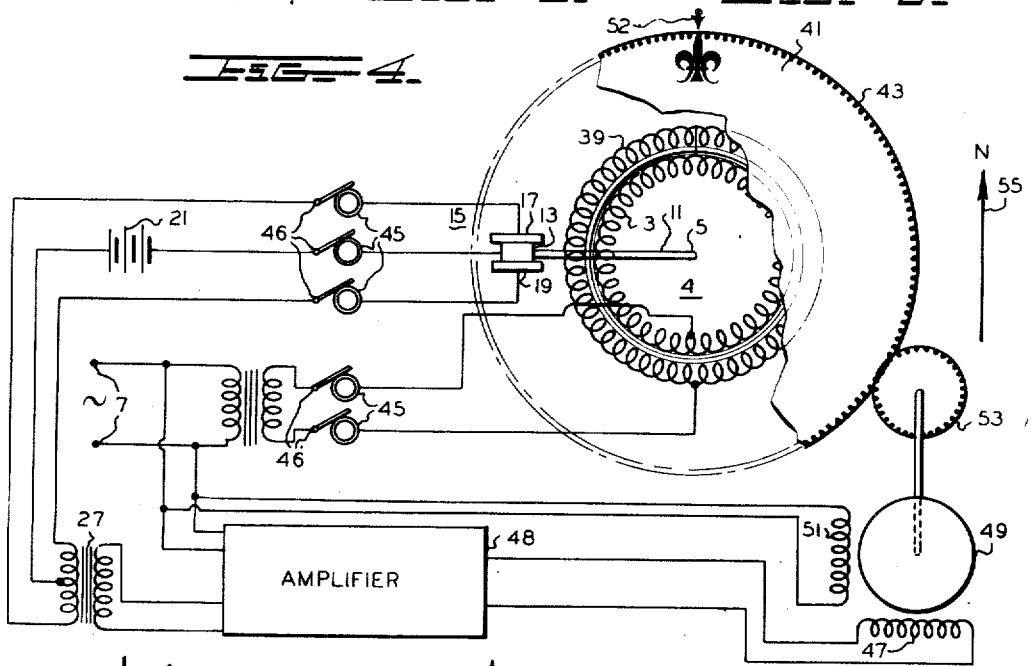
AMPLIFIER
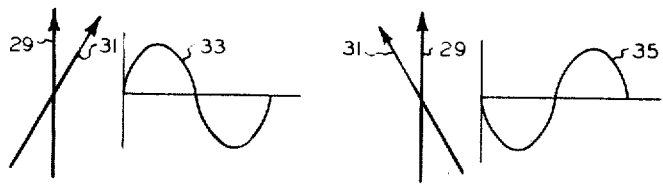
INVENTOR,
ALGER S. RIGGS,
BY
HIS ATTORNEY Patented Feb. 27, 1945

2,370,194

UNITED STATES PATENT OFFICE 2,370,194

STATIC EARTH INDUCTOR COMPASS

Alger S. Riggs, Chicago, Ill., assignor to Sperry Gyroscope Company, Inc., Brooklyn, N. Y., a corporation of New York Application January 29, 1942, Serial No. 428,652

7 Claims. (Cl. 33—204)

The present invention relates to devices for indicating the direction of a magnetic field, such as the earth's magnetic field. Previous devices of the present type have been mainly directed to the type using a pivoted magnetic needle to indicate the direction of the magnetic field, or a rotating inductor device for generating a potential indicative of the direction of the earth's field.

The present invention, on the other hand, is directed toward improved and novel devices for producing indications of the magnetic field direction without the necessity of continuously rotating or sensitive pivoted devices.

According to the present invention the magnetic field whose direction is to be indicated is caused to interact with an alternating magnetic field set up in a coil forming part of the device and thereby produces an oscillating torque upon relative displacement between the magnetic axis of the coil and the direction of the magnetic field. This oscillating torque is used to generate a reversing phase electrical voltage which may be used either to indicate the direction of the field or to operate suitable control devices, such as for repeater compass or automatic steering apparatus.

Accordingly, it is an object of the present invention to provide improved devices for indicating the direction of a magnetic field.

It is another object of the present invention to provide improved devices for producing an alternating signal voltage indicative of the direction of a magnetic field.

It is a further object of the present invention to provide improved compass means for indicating the direction of the earth's magnetic field.

It is still another object of the present invention to provide improved devices for producing a reversible phase voltage upon relative displacement of a pick-up member with respect to a magnetic field.

It is a still further object of the present invention to provide improved devices for producing a reversible phase oscillatory torque upon deviation from parallelism to a magnetic field.

Referring to the drawing,

Fig. 1 is a schematic representation of a simplified form of the present invention illustrating a principle thereof.

Figs. 2 and 3 show improved modifications of the device of Fig. 1.

Fig. 4 shows a complete device for positioning a member in accordance with the direction of a magnetic field.

Figs. 5 and 6 show explanatory diagrams useful in explaining the theory of operation of the present invention.

Referring to Fig. 1, the magnetic field to be measured or indicated is schematically illustrated by a coil 1 connected to a suitable source of direct current. It is to be understood that the present invention is not restricted to merely indicating the direction of the magnetic field of a coil, but that this coil 1 may be replaced by any source of magnetic field to be indicated, including the earth's field.

A movable coil 3 pivoted about an axis 5 perpendicular to the plane of the figure is energized from a suitable source 7 of alternating current for setting up in the coil 3 an auxiliary field which is alternating or oscillatory. Coil 3 may be connected to source 7 by means of suitable flexible conductors 9. It will be clear that, if the axis of coil 3 is not parallel to the axis of magnetic field 1, that is, if the magnetic axis is magnetically displaced from the axis of the magnetic field 1, a torque will be exerted on coil 3 by interaction of these two magnetic fields, similar to the ordinary electric motor action. Due to the alternating character of the flux created by coil 3, this torque will be alternating or oscillating in nature.

In the present invention this oscillating torque is used to provide suitable indications, or a control over a device, in response to the externally applied magnetic field. Thus, rigidly fastened to coil 3 is an arm 11 at whose other end is fastened the central member 13 of a double-button carbon microphone 15. Connected in circuit between central member 13 and outer terminals 17 and 19 of microphone 15 is a battery 21 and the two halves 23 and 25 of a transformer 27 having a center-tap primary. Thus, in response to the alternating torque produced on coil 3, arm 11 will pivot about pivot 5 to alternately compress carbon buttons 17 and 19, thereby causing a variation of the current flowing from battery 21 through these buttons 17, 19 and transformer primary 23, 25. If desired, arm 11 may be spring centralized.

It will be clear therefore that in the output of transformer 27, there will be produced an alternating voltage having the same frequency as the frequency of oscillation of arm 11, and therefore of the same frequency as source 7, and having a phase corresponding to the phase of motion of arm 11. The phase of this voltage will thus depend upon the relative sense of displacement of coil 3 with respect to magnetic field 1.

As shown in Fig. 5, if arrow 29 represents the direction of the magnetic field of coil 1 and arrow 31 represents the orientation of the axis of coil 3, a voltage will be produced in the output of transformer 27 having a predetermined phase. This voltage may have the wave shape shown at 33. However, if the relative displacement between coil 3 and magnetic field 1 has opposite sense, as illustrated in Fig. 6, the voltage output of transformer 27 will be of opposite phase, as shown at 35.

Accordingly, the device as just described will serve to produce an alternating voltage having a phase corresponding to the sense of relative displacement between coil 3 and the magnetic field to be measured. This voltage may be used to actuate a suitable indicater or any well known type of control device such as a repeater compass, a telemetering unit or an automatic control or steering device. Such an indicator is illustrated schematically by phase-sensitive voltmeter 37, which will indicate by its reading both the sense and magnitude of the displacement between coils 1 and 3.

Fig. 2 shows a modification of the device of Fig. 1 in that compensating coils 39 are used, normally positioned coaxial with coil 3. The magnetic field of these coils 39, which are fixed in position, is caused to oppose that of coil 3. These coils 39 prevent the flux produced by coil 3 from distorting the flux 1 to be measured, and thereby prevent detrimental effects on the indications produced when high current values are used in coil 3 for the purpose of increasing the torque magnitude, which depends on the product of the two fluxes. In addition, these compensating coils 39 insure zero torque on moving coil 3 in the absence of flux from fixed coil 1. These compensating coils 39 are shown as placed beside moving coil 3. However, it is preferable to mount these coils concentrically, the compensating coil 39 extending coaxial with and outside moving coil 3, as shown schematically in Fig. 3, wherein coil 1 has been omitted for clarity. A preferred form for these coils is as in Fig. 4.

Fig. 4 shows a complete system for indicating magnetic directions with respect to the earth's magnetic field. The magnetic field indicator is of generally the same type as just described. Here coil 3 is formed as a circular distributed two pole winding placed around the circumference of a supporting member 4. Compensating coil 39 is formed as a second distributed winding placed outside and closely adjacent to movable coil 3. Preferably, the compensating coil is so formed as to have equal and opposite magneto-motive force to that of moving coil 3. Compensating coil 39 and microphone device 15 are mounted on a movable disc 41 around whose periphery there are placed gear teeth 43. Movable coil 3 is pivotally mounted on platform 41 and is connected to microphone 15 by means of arm 11.

The various connections to the elements on disc 41 are made by means of appropriate slip rings 45 and brushes 46. Instead of using an indicator as at 37 the alternating phase-sensitive signal voltage obtained in the output of transformer 27 is fed to a suitable amplifier circuit 48 whose output controls one phase 47 of a two-phase motor 49 whose other phase 51 is energized directly from source 7 of alternating current. Amplifier 48 may be of the type shown in U. S. application Serial No. 148,653, filed June 17, 1937, including anti-hunting circuit means on which Patent No. 2,233,415 was granted to Harvard L. Hull, March 4, 1941.

In this way, the signal produced from the pick-up device described is used to re-orient disc 41, as by means of a gear 53 actuated by motor 49 and engaging gear 41. Motor 49 continues to operate so long as any signal is generated in the pick-up device, which means that the motor will continue to rotate disc 41 until the axis of coil 3 and of coil 39 is positioned parallel to the external magnetic field, in this case illustrated as the magnetic field of the earth, and indicated by arrow 55. The device therefore operates to automatically orient disc 41 along the earth's magnetic field and accordingly the device forms a highly satisfactory compass from which readings may be obtained with respect to a fixed index 52 cooperating with appropriate graduations on disc 41.

While the present invention has been described using a double carbon button microphone 15, it will be clear that any type of translating apparatus suitable for converting an oscillating torque into an alternating voltage may be used, including other types of microphone, such as the dynamic, condenser, crystal, ribbon, velocity, etc. types.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. A magnetic field indicator comprising a movable member, means responsive to relative angular displacement between said member and said field for producing an oscillating torque on said member, and means operated by said member responsive to the oscillation produced by said torque for indicating the direction of said field.

2. A magnetic field indicator comprising a movable member, means responsive to relative angular displacement between said member and said field for producing an oscillating torque on said member, means operated by said member for converting said oscillating torque into an alternating electrical voltage, and means responsive to said voltage for indicating the direction of said field.

3. A magnetic field indicator comprising a movable member, means responsive to relative angular displacement between said member and said field for producing an oscillating reversible-phase torque on said member, means operated by said member for converting said oscillating torque into a reversible-phase alternating electrical voltage, and phase-sensitive means responsive to said voltage for indicating the direction of said field.

4. A magnetic compass indicator comprising a movable member, means responsive to relative angular displacement of said member with respect to the earth's magnetic field for producing an oscillating reversible-phase torque on said member, and operated by said member means driving responsive to said oscillating torque for re-orienting said member into correspondence with said field, whereby the direction of said field is indicated.

5. A magnetic compass indicator comprising a movable member, means responsive to angular movement of said member from a predetermined angular position in the earth's magnetic field for producing an oscillating torque on said member, means operated by said member in response to said oscillating torque for converting said oscillating torque into a reversible-phase alternating electrical voltage whose phase corresponds to the sense of said movement, and means responsive to said voltage for re-orienting said member into said predetermined position, whereby the direction of said field is indicated.

6. A magnetic field indicator comprising a movable member having a magnetic axis and exposed to a magnetic field to be indicated, means for setting up in said member along its magnetic axis an auxiliary oscillating magnetic field reacting with said magnetic field to be indicated whereby said member is subjected to an oscillating torque upon relative angular displacement between the axis of said member and the magnetic field to be indicated, and means operated by oscillating member responsive to said torque for indicating the direction of said field to be indicated.

7. A magnetic field indicator, comprising a movable coil mounting having a pivot axis, a current-conducting coil carried by said mounting having a magnetic axis transverse to said pivot axis, and adapted to be exposed to a magnetic field to be indicated, means for passing alternating current through said current-conducting coil for reaction with the magnetic field to be indicated, whereby said coil and mounting are subjected to an oscillating torque upon relative angular displacement between the magnetic axis of the coil and the magnetic field to be indicated, and means operated by said coil mounting responsive to oscillating torque for indicating the direction of said field.

ALGER S. RIGGS.

CERTIFICATE OF CORRECTION.

Patent No. 2,370,194.   February 27, 1945.

ALGER S. RIGGS.

It is hereby certified that error appears in the printed specification of the above numbered patent requiring correction as follows: Page 2, second column, line 64, claim 4, after "and" insert --driving means"; line 64-65, strike out "means driving"; page 3, first column, line 16, claim 6, for "oscillating" read --said--; line 17, same claim, for "said" read --oscillating--; and that the said Letters Patent should be read with this correction therein that the same may conform to the record of the case in the Patent Office.

Signed and sealed this 5th day of June, A. D. 1945.

Leslie Frazer (Seal)

Acting Commissioner of Patents.

lating torque into a reversible-phase alternating electrical voltage whose phase corresponds to the sense of said movement, and means responsive to said voltage for re-orienting said member into said predetermined position, whereby the direction of said field is indicated.

6. A magnetic field indicator comprising a movable member having a magnetic axis and exposed to a magnetic field to be indicated, means for setting up in said member along its magnetic axis an auxiliary oscillating magnetic field reacting with said magnetic field to be indicated whereby said member is subjected to an oscillating torque upon relative angular displacement between the axis of said member and the magnetic field to be indicated, and means operated by oscillating member responsive to said torque for indicating the direction of said field to be indicated.

7. A magnetic field indicator, comprising a movable coil mounting having a pivot axis, a current-conducting coil carried by said mounting having a magnetic axis transverse to said pivot axis, and adapted to be exposed to a magnetic field to be indicated, means for passing alternating current through said current-conducting coil for reaction with the magnetic field to be indicated, whereby said coil and mounting are subjected to an oscillating torque upon relative angular displacement between the magnetic axis of the coil and the magnetic field to be indicated, and means operated by said coil mounting responsive to oscillating torque for indicating the direction of said field.

ALGER S. RIGGS.

---

CERTIFICATE OF CORRECTION.

Patent No. 2,370,194. February 27, 1945.

ALGER S. RIGGS.

It is hereby certified that error appears in the printed specification of the above numbered patent requiring correction as follows: Page 2, second column, line 64, claim 4, after "and" insert --driving means"; line 64-65, strike out "means driving"; page 3, first column, line 16, claim 6, for "oscillating" read --said--; line 17, same claim, for "said" read --oscillating--; and that the said Letters Patent should be read with this correction therein that the same may conform to the record of the case in the Patent Office.

Signed and sealed this 5th day of June, A. D. 1945.

Leslie Frazer (Seal)                                     Acting Commissioner of Patents.